(12) United States Patent
Sreedharan et al.

(10) Patent No.: US 12,437,253 B2
(45) Date of Patent: Oct. 7, 2025

(54) AUTOMATED WORKFLOW COMPOSER USING UNMODELED METRIC-BASED GOALS

(71) Applicant: International Business Machines Corporation, Armonk, NY (US)

(72) Inventors: Sarath Sreedharan, Tempe, AZ (US); Tathagata Chakraborti, Cambridge, MA (US); Vinod Muthusamy, Austin, TX (US); Yara Rizk, Cambridge, MA (US); Yasaman Khazaeni, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 18/147,802

(22) Filed: Dec. 29, 2022

(65) Prior Publication Data

US 2024/0220898 A1 Jul. 4, 2024

(51) Int. Cl.
*G06Q 10/0633* (2023.01)
*G06F 9/48* (2006.01)

(52) U.S. Cl.
CPC ....... *G06Q 10/0633* (2013.01); *G06F 9/4881* (2013.01)

(58) Field of Classification Search
CPC .............. G06Q 10/0633; G06Q 10/10; G06Q 10/06316; G06Q 10/103; G06Q 10/06311; G06Q 10/067
See application file for complete search history.

(56) References Cited

U.S. PATENT DOCUMENTS

| | | | | |
|---|---|---|---|---|
| 5,734,837 | A * | 3/1998 | Flores | G06Q 10/10 705/7.26 |
| 7,580,911 | B2 * | 8/2009 | Sun | G06Q 10/103 706/50 |
| 8,042,091 | B2 * | 10/2011 | Koehler | G06F 8/35 717/131 |
| 8,136,099 | B2 * | 3/2012 | Haller | G06Q 10/06 717/136 |

(Continued)

OTHER PUBLICATIONS

Fast, Ethan et al., A Conversational Agent for Complex Tasks CHI2018, ACM, Apr. 2018 (Year: 2018).*

(Continued)

*Primary Examiner* — Scott L Jarrett
(74) *Attorney, Agent, or Firm* — CANTOR COLBURN LLP; Robert Bean

(57) ABSTRACT

Embodiments of the invention are directed to a programmable computer system that includes a processor system operable to perform processor system operations. The processor system operations include using a workflow composer to perform an automated workflow composition process that generates a composed workflow that is operable to, when executed by a host device, satisfy a target logical goal. Performing the automated workflow composition process includes using a workflow-metric model to control the automated workflow composition process such that the composed workflow is operable to, when executed by the host device, satisfy the target logical goal in a manner that optimizes a target metric goal. The target metric goal quantifies a performance feature of the composed workflow.

20 Claims, 9 Drawing Sheets

(56) References Cited

U.S. PATENT DOCUMENTS

| | | | | |
|---|---|---|---|---|
| 8,332,864 | B2* | 12/2012 | Bose | G06Q 10/06 |
| | | | | 718/100 |
| 8,442,852 | B2* | 5/2013 | Sun | G06Q 30/0203 |
| | | | | 705/7.26 |
| 8,756,093 | B2* | 6/2014 | Isozaki | G06Q 10/0633 |
| | | | | 705/7.11 |
| 10,032,136 | B1* | 7/2018 | Hamilton | G06Q 10/0633 |
| 10,079,721 | B2 | 9/2018 | Nair et al. | |
| 10,176,003 | B2 | 1/2019 | Zeng | |
| 10,282,690 | B1* | 5/2019 | DelFranco | G06F 16/972 |
| 10,554,817 | B1* | 2/2020 | Sullivan | H04L 41/5054 |
| 10,586,196 | B2 | 3/2020 | Chen et al. | |
| 10,664,777 | B2* | 5/2020 | Volkov | G06Q 10/0633 |
| 10,832,681 | B1 | 11/2020 | Jethva | |
| 10,887,423 | B2 | 1/2021 | Somech et al. | |
| 10,909,503 | B1* | 2/2021 | Dias | G06N 20/00 |
| 10,923,109 | B2* | 2/2021 | Chakraborty | H04L 51/02 |
| 10,963,642 | B2 | 3/2021 | Douglas et al. | |
| 11,120,379 | B2* | 9/2021 | DelFranco | G06F 3/0484 |
| 11,200,539 | B2* | 12/2021 | Iyer | G06Q 10/0633 |
| 11,397,873 | B2* | 7/2022 | Kalluri | G06F 9/4881 |
| 11,477,142 | B1* | 10/2022 | Lewis | G06F 40/30 |
| 11,551,171 | B2* | 1/2023 | Rafferty | G06F 40/216 |
| 11,587,007 | B2* | 2/2023 | Geigel | G06N 20/00 |
| 11,615,339 | B2* | 3/2023 | Badhwar | G06N 20/00 |
| | | | | 706/12 |
| 11,625,152 | B1* | 4/2023 | Johnston | G06N 3/008 |
| | | | | 715/709 |
| 11,681,964 | B2* | 6/2023 | Shetty | G06Q 10/0633 |
| | | | | 705/7.27 |
| 11,755,603 | B1* | 9/2023 | Venkatesan | G06F 16/252 |
| | | | | 706/15 |
| 11,887,034 | B2* | 1/2024 | Shetty | G06Q 10/06393 |
| 2004/0162741 | A1* | 8/2004 | Flaxer | G06Q 10/10 |
| | | | | 705/7.26 |
| 2005/0043982 | A1* | 2/2005 | Nguyen | G06Q 10/0633 |
| | | | | 705/7.26 |
| 2005/0262489 | A1* | 11/2005 | Streeter | G06Q 10/10 |
| | | | | 717/144 |
| 2007/0094211 | A1* | 4/2007 | Sun | G06Q 30/0203 |
| | | | | 706/50 |
| 2007/0118563 | A1* | 5/2007 | Haller | G06Q 10/06 |
| 2008/0229276 | A1* | 9/2008 | Koehler | G06F 8/35 |
| | | | | 717/104 |
| 2008/0320486 | A1* | 12/2008 | Bose | G06Q 10/06 |
| | | | | 718/105 |
| 2010/0287016 | A1* | 11/2010 | Isozaki | G06Q 10/0633 |
| | | | | 705/7.27 |
| 2014/0229225 | A1* | 8/2014 | Bernier | G06Q 10/063116 |
| | | | | 705/7.27 |
| 2017/0098180 | A1* | 4/2017 | Chandraghatgi | G06Q 50/01 |
| 2018/0341533 | A1* | 11/2018 | Shanbhag | G06F 9/543 |
| 2019/0019112 | A1 | 1/2019 | Gelfenbeyn et al. | |
| 2019/0205726 | A1 | 7/2019 | Khabiri et al. | |
| 2019/0205792 | A1* | 7/2019 | Huang | G06F 9/4881 |
| 2019/0238487 | A1* | 8/2019 | Ciano | G06N 3/006 |
| 2019/0251488 | A1* | 8/2019 | Delfranco | G06F 16/951 |
| 2019/0325304 | A1* | 10/2019 | Gottin | G06N 3/045 |
| 2019/0354874 | A1 | 11/2019 | Shah et al. | |
| 2020/0004874 | A1* | 1/2020 | Gupta | G10L 15/22 |
| 2020/0183961 | A1* | 6/2020 | Dhoolia | G10L 15/01 |
| 2020/0219494 | A1* | 7/2020 | Dhoolia | G10L 15/16 |
| 2020/0234190 | A1 | 7/2020 | Beaver | |
| 2020/0342032 | A1 | 10/2020 | Subramaniam et al. | |
| 2020/0364511 | A1* | 11/2020 | Brown | G06F 16/3329 |
| 2021/0089860 | A1 | 3/2021 | Heere et al. | |
| 2021/0089990 | A1* | 3/2021 | Day | G06F 3/0482 |
| 2021/0107140 | A1* | 4/2021 | Singh | G05B 19/4155 |
| 2021/0110394 | A1* | 4/2021 | Chen | G06Q 20/105 |
| 2021/0279553 | A1* | 9/2021 | Zhu | G06N 3/105 |
| 2021/0383259 | A1* | 12/2021 | Dmitriev | G06Q 10/0639 |
| 2021/0383291 | A1* | 12/2021 | Elliott | G06F 16/951 |
| 2022/0147197 | A1* | 5/2022 | Tross | G06F 40/103 |
| 2022/0172220 | A1* | 6/2022 | Ladkat | G06Q 10/10 |
| 2022/0180291 | A1* | 6/2022 | Abeykoon | G06Q 10/0633 |
| 2022/0309240 | A1* | 9/2022 | Rizk | G06F 40/30 |
| 2023/0083159 | A1* | 3/2023 | Padmanabhan | G06Q 10/0633 |
| | | | | 705/7.27 |
| 2023/0274095 | A1* | 8/2023 | Kelkar | G06F 40/49 |
| | | | | 704/9 |
| 2023/0376838 | A1* | 11/2023 | El Hattami | G06F 40/35 |
| 2023/0409584 | A1* | 12/2023 | Venkatesan | H03M 7/30 |

OTHER PUBLICATIONS

Sun, Ron et al., Sequence Learning: From Recognition and Prediction to Sequential Decision Making IEEE Intelligent Systems, 2001 (Year: 2001).*

Zhang, Zhewei et al., A recurrent neural network framework for flexible and adaptive decision making based on sequence learning PLOS Computational Biology, vol. 16, No. 11, 2020 (Year: 2020).*

"How to Use KPIs to Measure Your Business Process Management Goals." Kissflow. https://kissflow.com/workflow/bpm/business-process-management-kpi/ (retrieved Dec. 15, 2022). Mar. 2021. 4 pages.

Chattopadhyay et al. "Evaluating visual conversational agents via cooperative human-ai games." Fifth AAAI Conference on Human Computation and Crowdsourcing. 2017. 9 pages.

Jiang et al. "Automatic online evaluation of intelligent assistants." Proceedings of the 24th International Conference on World Wide Web. 2015. 11 pages.

Kiseleva et al. "Predicting user satisfaction with intelligent assistants." Proceedings of the 39th International ACM SIGIR conference on Research and Development in Information Retrieval. 2016. 11 pages.

Kostenko et al. "Creative virtual composer assistant based on the eBICA framework." Procedia Computer Science 169 (2020): 606-614.

Kulkarni et al. "Explicable planning as minimizing distance from expected behavior." AAMAS Conference proceedings. 2019. 3 pages.

Moreno. "Key Performance Indicators for Cloud BPM—Short and long term KPI's." Flokzu. https://www.flokzu.com/2021/11/04/key-performance-indicators-bpm/ (retrieved Dec. 15, 2022). Nov. 2021. 7 pages.

Rizk et al. "A conversational digital assistant for intelligent process automation." International Conference on Business Process Management. Springer, Cham, 2020. 15 pages.

Sreedharan, Sarath, et al. "Explainable composition of aggregated assistants." arXiv preprint arXiv:2011.10707 (2020). 10 pages.

* cited by examiner

AUTOMATED WORKFLOW COMPOSER USING UNMODELED METRIC-BASED GOALS

BACKGROUND

The present invention relates in general to programmable computer systems. More specifically, the present invention relates to computing systems, computer-implemented methods, and computer program products operable to automatically generate workflows that satisfy logic-based goals while optimizing metric-based goals and logic-based goals.

A dialogue system or conversational agent (CA) or a "chatbot" is a computer system configured to communicate with a human using a coherent structure. CA systems can employ a variety of communication mechanisms, including, for example, text, speech, graphics, haptics, gestures, and the like for communication on both the input and output channels. In general, a CA system can be defined as a computer system configured to communicate with a human using a coherent structure. CA systems can employ a variety of communication mechanisms, including, for example, text, speech, graphics, haptics, gestures, and the like for communication on both the input and output channels. CA systems also employ various forms of natural language processing (NLP), which is a field of computer science, artificial intelligence, and computational linguistics concerned with the interactions between computers and humans using language.

In order to design more sophisticated CA system, CA systems can be design as a so-called an "aggregated assistant" where the CA system is built out of individual components called skills. A skill is a unit of automation that performs atomic tasks that can be composed together to build a CA system capable of performing more complex tasks.

SUMMARY

Embodiments of the invention provide a programmable computer system that includes a processor system operable to perform processor system operations. The processor system operations include using a workflow composer to perform an automated workflow composition process that generates a composed workflow that is operable to, when executed by a host device, satisfy a target logical goal. Performing the automated workflow composition process includes using a workflow-metric model to control the automated workflow composition process such that the composed workflow is operable to, when executed by the host device, satisfy the target logical goal in a manner that optimizes a target metric goal. The target metric goal quantifies a performance feature of the composed workflow.

Embodiments of the invention also provide computer-implemented methods and computer program products having substantially the same features as the programmable computer system described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
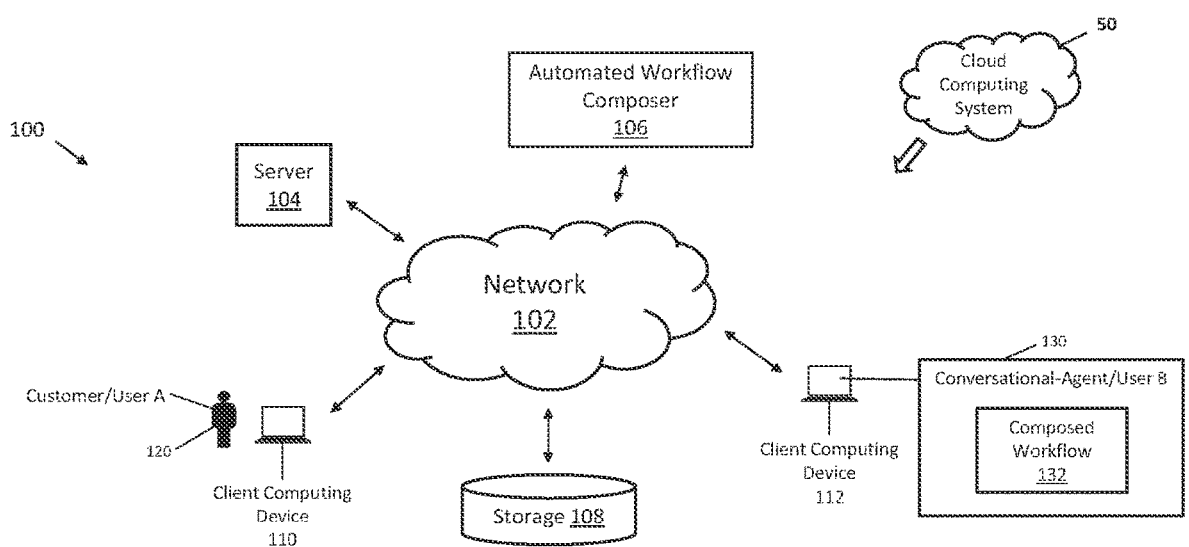
FIG. 1 depicts a block diagram illustrating a system embodying aspects of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

Many of the functional units of the systems described in this specification have been labeled as models. Embodiments of the invention apply to a wide variety of model implementations. For example, the models described herein can be implemented as machine learning algorithms and natural language processing algorithms configured and arranged to uncover unknown relationships between data/ information and generate a model that applies the uncovered relationship to new data/information in order to perform an assigned task of the model. In aspects of the invention, the models described herein can have all of the features and functionality of the models depicted in FIGS. 6 and 7, which are described in greater detail subsequently herein.

The various components/modules/models of the systems illustrated herein are depicted separately for ease of illustration and explanation. In embodiments of the invention, the functions performed by the various components/modules/models can be distributed differently than shown without departing from the scope of the various embodiments of the invention describe herein unless it is specifically stated otherwise.

Turning now to an overview of aspects of the invention, embodiments of the invention described herein provide computing systems, computer-implemented methods, and computer program products operable to generate workflows that satisfy metric-based goals and logic-based goals. Some embodiments of the invention provide a programmable computer system that includes a processor system operable to perform processor system operations. The processor system operations include using a workflow composer to perform an automated workflow composition process that generates a composed workflow that is operable to, when executed by a host device, satisfy a target logical goal. Performing the automated workflow composition process includes using a workflow-metric model to control the automated workflow composition process such that the composed workflow is operable to, when executed by the host device, satisfy the target logical goal in a manner that optimizes a target metric goal. The target metric goal quantifies a performance feature of the composed workflow.

In addition to one or more of the features described above, or as an alternative to any of the foregoing embodiments, the workflow-metric model has been trained, using a sequential decision-making (SDM) algorithm, to generate a predicted metric that would result from the host device executing a sequence of workflow tasks. In some embodiments of the invention, the SDM algorithm can be implemented as a combination of machine learning (the sequence-to-value predictor that is learned) and a search algorithm.

In addition to one or more of the features described above, or as an alternative to any of the foregoing embodiments, the predicted metric quantifies a predicted performance feature of the sequence of workflow tasks.

In addition to one or more of the features described above, or as an alternative to any of the foregoing embodiments, the automated workflow composition process includes searching a plurality of combinations of possible workflows.

In addition to one or more of the features described above, or as an alternative to any of the foregoing embodiments, the target logical goal includes a state of the host device that can be either true or false.

In addition to one or more of the features described above, or as an alternative to any of the foregoing embodiments, the automated workflow composition process generates the composed workflow based at least in part on the logic-based goal, the target metric goal, and domain features of the host device.

In addition to one or more of the features described above, or as an alternative to any of the foregoing embodiments, the host device includes but is not limited to a conversational agent; the target metric goal includes but is not limited to a key performance indicator (KPI) goal; and the workflow-metric model includes but is not limited to a sequence-to-value predictor.

In addition to one or more of the features described above, or as an alternative to any of the foregoing embodiments, embodiments of the invention also provide computer-implemented methods and computer program products having substantially the same features as the programmable computer system described above.

Figure 3:
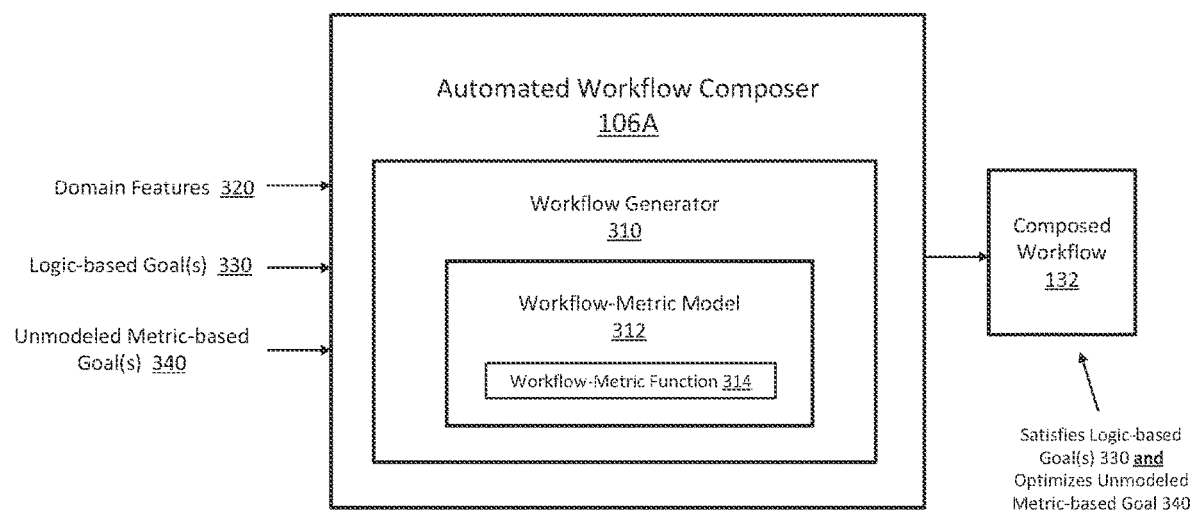
FIG. 3 depicts a block diagram illustrating a system according to embodiments of the invention.
Figure 4:
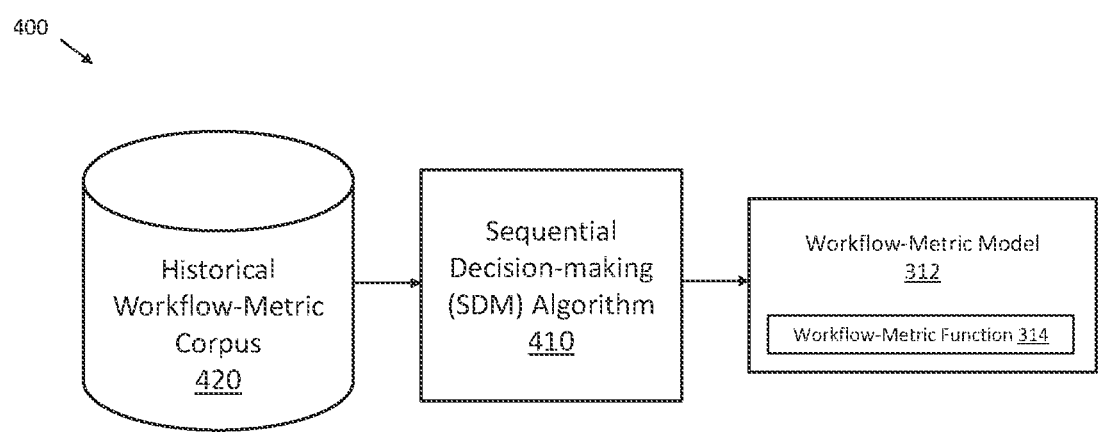
FIG. 4 depicts a block diagram illustrating a system according to embodiments of the invention.
Figure 5:
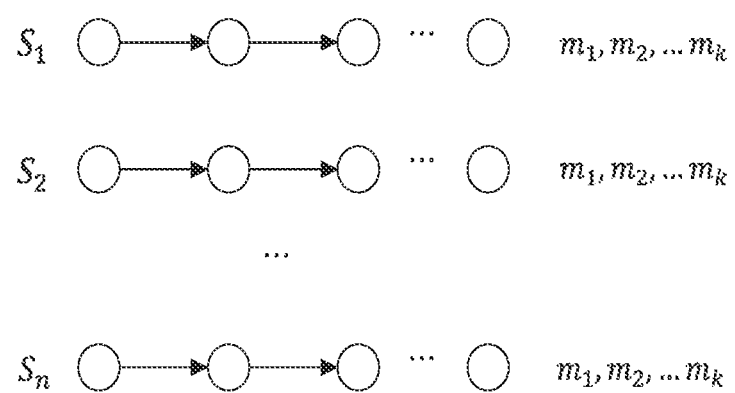
FIG. 5 depicts a block diagram illustrating a system according to embodiments of the invention.

Turning now to a more detailed description of various embodiments of the invention, FIG. 1 depicts a block diagram illustrating a "synchronous conferencing system" (SCS) operable to implement aspects of the invention, including specifically using an automated workflow composer 106 to generate a composed workflow 132 that can be incorporated within a conversational-agent (CA) 130. In accordance with aspects of the invention, the automated workflow composer 106 is operable to perform an automated workflow composition process that generates the composed workflow 132. In accordance with aspects of the invention, the composed workflow 132 is operable to, when executed by the client computing device 112 (i.e., the host device), satisfy a target logical goal. For example, in the SCS 100, a target logical goal of the composed workflow 132 could include "provide an answer to customer questions that inquire whether or not an item is in the in-store inventory." Performing the automated workflow composition process includes using a novel workflow-metric model (e.g., the workflow-metric model 312 shown in FIG. 3) to control the automated workflow composition process such that the composed workflow 132, when executed by the client computing device 112, satisfies the target logical goal in a manner that also optimizes a target metric goal. In accordance with aspects of the invention, the target metric goal quantifies a performance feature of the composed workflow 132. For example, where the target logical goal of the composed workflow 132 is "provide an answer to customer questions that inquire whether or not an item is in the in-store inventory," the target metric goal could be satisfying the target logical goal in a manner that optimizes the quality of experience (QoE) scores associated with the user's experience. In general, QoE is a measure of the delight or annoyance a user experiences when utilizing a service such as web browsing, phone calls, TV broadcasts, and the like. Additional details of how the automated workflow composer 106 operates in accordance with aspects of the invention are depicted in FIGS. 3-5 and described subsequently herein.

The SCS 100 is a non-limiting example of an operating domain of the CA 130 and the associated composed workflow 132. In accordance with aspects of the invention, the automated workflow composer 106 and the composed workflow 132 can be utilized in connection with a wide variety of domains that utilize, or can be configured to utilize, a conversational agent such as the CA 130.

In general, the SCS 100 falls within a class of computer-based communication technologies that are widely used on interactive computing networks (e.g., the internet) to enable two or more users to communicate with one another in real time. Specifically, a user sends a message (e.g., natural language textual data) to another user through a synchronous conferencing application or computer program of the SCS. The latter user ideally responds to the message within a short period of time, typically seconds or minutes at the most. Thus, the SCS 100 facilitate a conversation in which electronic messages are passed back and forth between at least two users.

Messages exchanged through the SCS 100 generally contain textual data. However, some SCS technologies allow the exchange of other types of multimedia content (e.g., audio/video). The messages are typically short in length, though longer messages can be appropriate in certain contexts (e.g., a question/answer exchange). Frequently, multiple messages that are part of the same conversation are exchanged within a so-called SCS session that beneficially groups the related messages together and provides context. The messages are frequently displayed to each user within a window in a graphical user interface (GUI) at the user's local computer display.

The SCS 100 can be implemented as a customer service tool in online ecommerce settings where it is desirable to allow online customers visiting a merchant's website to immediately initiate an online conversation/chat with a merchant. In a conventional customer-service SCS session, the customer is one user, and a representative of the merchant is another user. In some implementations of a customer-service SCS, the merchant representative can be a person, which is also known as a "live-agent." In some implementations of a customer-service SCS, the merchant representative can be a computer-implemented agent, which is also known as a "conversational agent" (CA) or a "chat-bot" (e.g., the CA 130 in the SCS system 100). In general, the CA 130 in the system 100 can be implemented as a computer system configured to communicate with a human using a coherent structure. The CA 130 can employ a variety of communication mechanisms, including, for example, text, speech, graphics, haptics, gestures, and the like for communication on both the input and output channels. The CA 130 can also employ various forms of natural language processing (NLP), which is a field of computer science, artificial intelligence, and computational linguistics concerned with the interactions between computers and humans using language.

The SCS 100 depicted in FIG. 1 includes a server 104, multiple client computing devices 110, 112 and a storage element 108, all of which are in communication with one another through a network 102. A customer (or User C) 120 has access to the client computing device 110 for purposes of operating the client computing device 110 in a manner that allows the customer 120 to participate in a synchronous conference over the network 102 with other users of the network 102 (e.g., the CA 130). The CA (or User B) 130 is in communication with (or incorporated within) the client computing device 112 for purposes of operating the client computing device 112 in a manner that allows the CA 130 to participate in a synchronous conference over the network 102 with other users of the network 102 (e.g., the customer 120). In accordance with aspects of the invention, the CA 130 includes a composed workflow 132 generated by the automated workflow composer 106 in accordance with embodiments of the invention.

A cloud computing system 50 is in wired or wireless electronic communication with the system 100, and in particular with the server 104. The cloud computing system 50 can supplement, support or replace some or all of the functionality (in any combination) of the system 100, including specifically the automated workflow composer 106. Additionally, some or all of the functionality of the system 100, including specifically the automated workflow composer 106, can be implemented as a node of the cloud computing system 50. Additional details of cloud computing functionality that can be used in connection with aspects of the invention are depicted by the computing environment 800 shown in FIG. 8 and described in greater detail subsequently herein.

For ease of illustration, one example of each of server 104, the storage element 108, and the client computing devices 110, 112 is shown. However, it is understood that embodiments of the invention can accommodate any number of the server 140, the storage element 108, and the client computing devices 110, 112. Similarly, for ease of illustration, one example of each of the CA 130 and the customer 120 is shown. However, it is understood that embodiments of the invention can accommodate any number of the CA 130 and the customer 120. In embodiments of the invention, the server 104 and the client computing devices 110, 112 can be configured to include some of all of the features and functionality of the computing system environment 800 (shown in FIG. 8).

The SCS 100 is configured and arranged to provide a mechanism for defining and managing virtual discussion threads in the SCS 100. In operation, the server 104 and one or more of the client computing devices 110, 112 define a virtual discussion thread (VDT) entity that includes a group of chat entries or parts of chat entries. The chat entries in a VDT logically belong to the same "hidden" discussion within a chat session. Use of the VDT enables the SCS 100 to support a user in understanding existing discussions by showing VDTs available in an overall list of chat entries and evidencing the chat entries in a VDT.

The SCS 100 can be utilized in many different types of data processing environments including a distributed data processing environment, a single data processing device, or the like. The SCS 100 includes at least one network 102, which is the medium used to provide communication links between various devices and computers connected together within the SCS 100. The network 102 can include connections, such as wire, wireless communication links, or fiber optic cables. The client computing devices 110, 112 can be, for example, personal computers, network computers, or the like. In the depicted example, the server 104 provides data, such as boot files, operating system images, and applications to the client computing devices 110, 112. The client computing devices 110, 112 are clients to the server 104 in the depicted example. The SCS 100 may include additional servers, client computing devices, and other devices not shown.

In some embodiment of the invention, the network 102 of the SCS 100 can be the internet as represented by a worldwide collection of networks and gateways that use the transmission control protocol/internet protocol (TCP/IP) suite of protocols to communicate with one another. At the heart of the internet is a backbone of high-speed data communication lines between major nodes or host computers, consisting of thousands of commercial, governmental, educational and other computer systems that route data and messages. In some embodiments of the invention, the network 102 of the SCS 100 can also include a number of different types of networks, such as for example, an intranet, a local area network (LAN), a wide area network (WAN), or the like.

In some embodiments of the invention, the server 104 can be a chat server, and the CA 130 and the customer 120 (using their respective client computing device 112, 110) can be participants/clients in a chat. Although not shown, a chat can have only two participants or many participants, perhaps hundreds or more. In some embodiments of the invention, a chat can be any synchronous conferencing, such as a text chat, audio/video conferencing, instant messaging, and the like. Examples of synchronous conferencing technologies that can be utilized by the SCS 100 include internet relay chat (IRC), jabber (XMPP), multi-user dungeons (MUDs), massively multi-player online role playing games (MMORPGs), protocol for synchronous conferencing (PSYC), and web chats.

Generally, chat services can be categorized into two main types, namely, one-to-one chats and group chats. One-to-one chat services, such as instant messaging (IM) services, typically involve chatting between two participants, although some IM services allow more than two participants. Group chats allow hundreds, perhaps thousands, of people to connect at the same time, because messages are broadcast to all the people who are connected to the group or channel. Channels are usually defined based on the topic content and language used by participants, and conversation chat windows can be one for every channel.

In some embodiments of the invention, the server 104 can manage authentication and authorization to access the chat service. The server 104 can also be responsible for the reception and delivery of messages among the connected users. The client computing device 110, for example, provides an interface between the customer 120 and the server 104. In some embodiments of the invention, the client computing device 110 provides a chat window where messages are displayed in a chronological list. The chat window can also include a text box in which the user (e.g., User A 120 and/or User B) can type a current message or chat entry (CE) for delivery to the server 104. The chat window can further include a display box to present information received from the the server 104, such as the number of connected users, nicknames, and the like.

The SCS 100 can be applied as a customer service tool in online ecommerce settings where it is desirable to allow online customers (e.g., User A 120) visiting a merchant's website (e.g., hosted by the server 104) to immediately initiate an online conversation/chat with a merchant (e.g., through CA/User B 130). In some embodiments of the invention, the CA 130 is a computer system configured to communicate with a human (and/or another CA) using a coherent structure. The CA 130 can employ a variety of communication mechanisms, including, for example, text, speech, graphics, haptics, gestures, and the like for communication on both the input and output channels. Accordingly, messages exchanged through the SCS 100 can take the form of text, speech, graphics, haptics, gestures, and the like. The CA 130, in accordance with some aspects of the invention, can employ various forms of machine learning techniques with natural language processing (NLP) functionality. In general NLP is a field of computer science, artificial intelligence, and computational linguistics concerned with the interactions between computers and humans using language. Additional details of how the SCS 100, including specifically the CA 130, can be utilized to implement embodiments of the invention are described in greater detail subsequently herein. In some embodiments of the invention, natural language processing (NLP) techniques are utilized with machine learning (ML) algorithms to generate models that perform the various language and text related tasks described herein in accordance with aspects of the invention. In general, NLP/ML models in accordance with embodiments of the invention can be built according to a variety of suitable encoder-decoder architectures.

In some embodiments of the invention, the CA 130 can be implemented in a manner that includes so-called question and answer (Q&A) technology operable to generate an answer to natural language questions that are presented by another user (e.g., User A 120) of the SCS 100. As a non-limiting example, suitable Q&A technology can include all of the features and functionality of a DeepQA technology developed by IBM®. DeepQA is a Q&A system that can conduct an interrogation on any subject by applying elements of natural language processing, machine learning, information retrieval, hypothesis generation, hypothesis scoring, final ranking, and answer merging to arrive at a conclusion. Q&A systems such as IBM's DeepQA technology often use unstructured information management architecture (UIMA), which is a component software architecture for the development, discovery, composition, and deployment of multi-modal analytics for the analysis of unstructured information and its integration with search technologies developed by IBM®.

The CA 130 is operable to implement, for example, a pre-defined conversational workflow that maps out the conversations in which the CA 130 can participate like a flowchart. When User A 120 triggers a conversation, the CA 130 guides the ensuing conversation through a conversation workflow, step by step. In general, a workflow is the series of activities that are necessary to complete a task. Each step in a workflow has a specific step before it and a specific step after it, with the exception of the first and last steps. In a linear workflow, an outside event usually initiates the first step. If the workflow has a loop structure, however, the completion of the last step will usually restart the first step.

Figure 2:
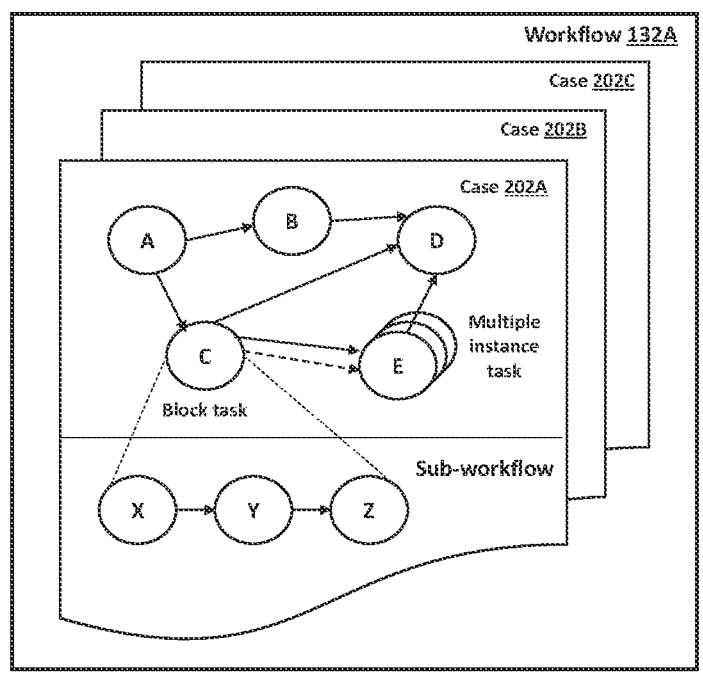
FIG. 2 depicts an example of a workflow that can be utilized in embodiments of the invention.

FIG. 2 depicts details of a workflow 132A, which is a non-limiting example of how the composed workflow 132 (shown in FIG. 1) can be structured. The workflow 132A (or workflow model) is a description of a computer-implemented process in sufficient detail that it is able to be directly executed by a host device such as the CA 130 using, for example, a workflow management system of the CA 130. The workflow model 132A is composed of a number of tasks or nodes (labeled A-E and X-Z), which are connected in the form of a directed graph. An executing instance of the workflow model 132A is called a case 202A or process instance. There can be multiple cases 202A, 202B, 202C of the workflow model 132A running simultaneously, however each of these cases 202A, 202B, 202C is assumed to have an independent existence and they typically execute without reference to each other.

There is usually a unique first task and a unique final task in a workflow. These are the tasks that are first to run and last to run in a given workflow case. Each invocation of a task is termed a task instance (e.g., labeled A-E and X-Z in FIG. 2). A task instance can initiate one or several task instances when it completes. This is illustrated in FIG. 2 by a directional arrow from the completing task to the task being initiated. For example, in FIG. 2, task instance B is initiated when task instance A completes. This can also occur conditionally, and, where this is the case, the edge between task instances indicates the condition that must be satisfied for the subsequent task instance to be started. For example, task instance C can be configured to define a value for variable M, and task instance D can be initiated on the condition that task instance C completes and the data element M is greater than a predetermined value.

Each task (labeled A-E and X-Z in FIG. 2) corresponds to a single unit of work. The distinct types of task include atomic tasks, block tasks, multi-instance task, and multi-instance blocks. An atomic task (e.g., task instance A) is one which has a simple, self-contained definition (i.e. one that is not described in terms of other workflow tasks) and only one instance of the task executes when it is initiated. A block task (e.g., task instance C) is a complex action which has its implementation described in terms of a sub-workflow (e.g., task instances X, Y, Z). When a block task is started, it passes control to the first task(s) in its corresponding sub-workflow. This sub-workflow executes to completion and at its conclusion, it passes control back to the block task.

A multiple-instance task (e.g., task E) is a task that can have multiple distinct execution instances running concurrently within the same workflow case. Each of the instances executes independently. Only when a nominated number of these instances have completed is the task following the multiple instance task initiated. A multi-instance block task is a combination of the two previous constructs and denotes a task that can have multiple distinct execution instances each of which is block structured in nature (i.e., has a corresponding sub-workflow). The control flow between tasks occurs via the control channel which is indicated by a solid directional arrow between tasks. There can also be a distinct data channel between workflow tasks which provides a means of communicating data elements between two connected tasks. Where a distinct data channel is intended between tasks, it is illustrated with a broken (dash-dot) directional arrow or line between them as illustrated in FIG. 2 between task instances C and task instance E. In other scenarios, the control and data channels are combined, however in both cases, data elements are passed along a channel between tasks.

FIG. 3 depicts an example of how the automated workflow composer 106 (shown in FIG. 1) can be implemented as an automated workflow composer 106A. As shown, the automated workflow composer 106A includes a workflow generator 310. In accordance with aspects of the invention, the workflow generator 310 includes a workflow-metric model 312 operable to apply a workflow-metric function 314. In accordance with embodiments of the invention, the automated workflow composer 106A is operable to receive domain features 320, logic-based goals 330, and/or unmodeled metric-based goals 340. In accordance with aspects of the invention, the domain features 320, the logic-based goals 330, and/or the unmodeled metric-based goals 340 are used by the workflow generator 310 to generate the compose workflow 132. More specifically, the workflow generator 310 uses the workflow-metric model 312 to generate the composed workflow 132 such that the composed workflow 132, when executed by the CA 130, satisfies the logic-based goals 330 while optimizing the unmodeled metric-based goals. In accordance with embodiments of the invention, the workflow-metric model 312 uses a workflow-metric function 314 that has been trained to learn the relationship between the unmodeled metric-based goals 340 and the sequence of workflow tasks that make up the composed workflow 132.

FIG. 4 depicts a non-limiting example of a system 400 that can be utilized to train the workflow-metric model 312 to uncover and apply the workflow-metric function 314. In embodiments of the invention, the system 400 includes a historical workflow-metric corpus 420 and a sequential decision-making (SDM) algorithm 410 operable to generate the workflow-metric model 312 and the workflow-metric function 314. In embodiments of the invention, the historical workflow-metric corpus 420 includes known workflow sequences (e.g., $S_1, S_2, \ldots S_n$ shown in FIG. 5; wherein n=a whole number greater than 2) or traces from a variety of domains that have been performed and annotated (or labeled) with the various types of metrics (e.g., $m_1, m_2, \ldots m_k$, shown in FIG. 5; where k=a whole number greater than 2) that are associated with the workflow sequence and that provide a metric indication of the performance of the workflow sequence. In general, the annotated metrics include various performance-related measurements that describe performance results that flow from executing the associated sequence. In some embodiments of the invention, the annotated metrics can include what are generally known as key performance indicators (KPIs). In general, a KPI is a critical or key quantifiable indicator of progress toward an intended result. KPIs are used in process management to provide a focus for strategic and system-wide improvement, create an analytical basis for decision making, and help focus attention on what matters most in a given domain for a given process. Non-limiting examples of KPIs include cost, time, cost, efficiency, QoE, and the like. Embodiments of the invention provide novel systems and methods of labeling, learning, and incorporating a KPI into a traditional workflow generator. Because KPIs can be arbitrary, without benefit of aspects of the invention, such KPIs cannot be represented as logical goals in the input of a composer.

In accordance with embodiments of the invention, the metric-labeled workflow sequences of the historical workflow-metric corpus 420 are applied to a suitable learning algorithm (e.g., a sequence-to-value predictor) that can model or map a sequence to a value (e.g., a number) to uncover the functional relationships between the metric labels and their associated sequences or traces in order to train the workflow-metric model 312 and uncover the workflow-metric function 314, which corresponds to and captures the previously-described functional relationships between the metric labels and their associated sequences or traces.

In embodiments of the invention, the learning algorithm can be implemented as the SDM algorithm 410. Some machine learning algorithms assume that data points are dispersed independently and identically, however in many cases, such as with language, voice, and time-series data, one data item is dependent on those that come before or after it. Sequence data (e.g., $S_1, S_2, \ldots S_n$ shown in FIG. 5; wherein n=a whole number greater than 2) is another name for this type of information. In machine learning as well, a similar concept of sequencing is followed to learn from a sequence of data. Machine learning models that input or output data sequences are known as sequence models. Text streams, audio clips, video clips, time-series data, and other types of sequential data are examples of sequential data. Recurrent neural networks (RNNs) are a well-known method used in sequence models, whereas convolutional neural networks (CNN) are better suited to treat spatial data.

Embodiments of the invention can implement the previously-described learning algorithm as the SDM algorithm 410 having the features and functionality described above. In some embodiments of the invention the SDM algorithm 410 can be implemented as an RNN having long short-term memory (LSTM) functionality (e.g., an LSTM algorithm). Long-range dependencies can be captured via LSTM, which has the ability to remember prior inputs for long periods of time. An LSTM cell has three gates. These gates are used in LSTM to manipulate memory. The gradient propagation in the memory of a RNN is controlled by gates in LSTM.

Figure 6:
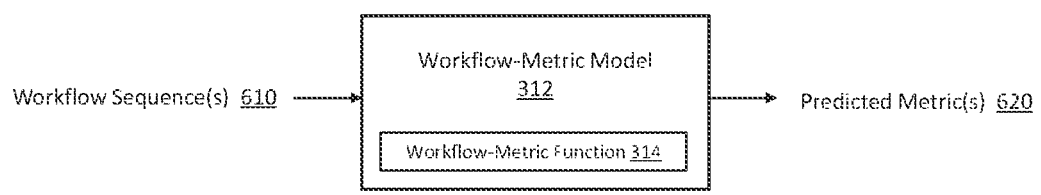
FIG. 6 depicts a block diagram illustrating a system according to embodiments of the invention.

As shown in FIG. 6, once the workflow-metric model 312 has been trained, it can accept new workflow sequences 610 and generate a predicted metric (value and/or type) 620 that would be associated with the new work flow sequence 610 when it is executed. In embodiments of the invention, the workflow sequences 610 are generated by the workflow generator 310 (shown in FIG. 3) during a process of generating the composed workflow 132 (shown in FIG. 3). In embodiments of the invention, the work-flow metric model 312 can be trained to generate or predict one or more of the predicted metric 620 for a given instance of the work-flow sequence 610.

Returning now to the automated workflow composer 106A shown in FIG. 3, the workflow generator 310 can be implemented in any suitable manner. In some embodiments of the invention, the workflow generator 310 is operable to perform a workflow search process that uses the domain features 320, the logic-based goals 330, and the unmodeled metric-based goals 340 to search through a space of all the possible workflows and combinations of workflows to find a workflow or combination of workflows that will satisfy the logic-based goals 330. In embodiments of the invention, the workflow-metric model 312 is used to evaluate candidate workflows (e.g., workflow sequence 610 shown in FIG. 6) generated during the workflow search process and predict values (e.g., predicted metric 620 shown in FIG. 6) for the unmodeled metric-based goal(s) 340. In embodiments of the invention, the workflow-metric model 312 (shown in FIG. 3) works in tandem with an optimization engine (not shown separately from the workflow generator 310) to modify how the search process produces workflows to arrive at the composed workflow 132. In embodiments of the invention, the optimization engine and the workflow-metric model do not allow the search process to head for the logic-based goal 330 directly (i.e., taking the shortest workflow path(s)), but instead controls the search process to use the predicted metrics 620 (shown in FIG. 6) to indicate how close the candidate workflows generated by the search process are to the logic-based goals 330. Using this approach to the search process, in accordance with embodiments of the invention, means that, at the end of the search process, the composed workflow 132 will still satisfy the logic-based goals 330 but will do so in a way that also optimizes the unmodeled metric-based goals 340. In other words, the search process in accordance with embodiments of the invention is biased toward the unmodeled metric-based goals 340.

An example of machine learning techniques that can be used to implement aspects of the invention will be described with reference to FIGS. 7A and 7B. Machine learning models configured and arranged according to embodiments of the invention will be described with reference to FIG. 7A.

Figure 7A:
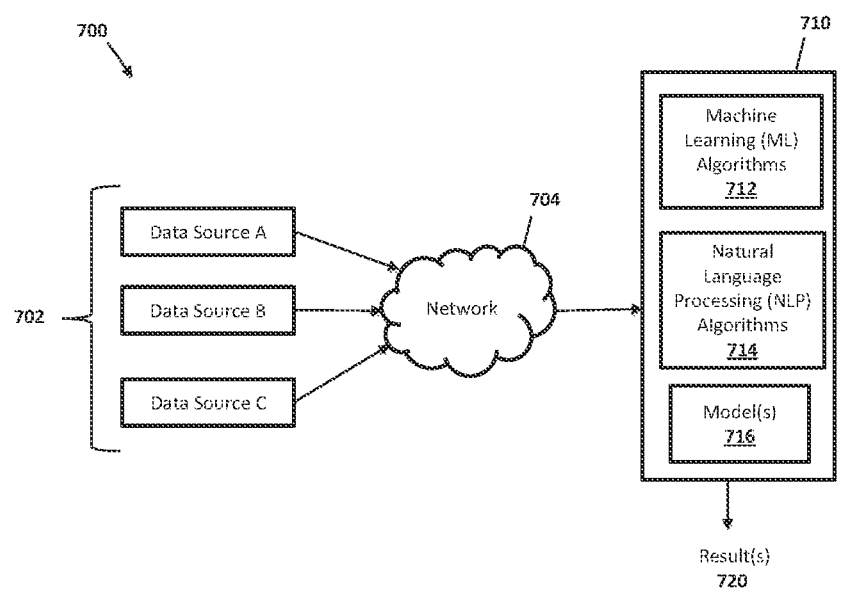
FIG. 7A depicts a machine learning system that can be utilized to implement aspects of the invention.

FIG. 7A depicts a block diagram showing a machine learning or classifier system 700 capable of implementing various aspects of the invention described herein. More specifically, the functionality of the system 700 is used in embodiments of the invention to generate various models and sub-models that can be used to implement computer functionality in embodiments of the invention. The system 700 includes multiple data sources 702 in communication through a network 704 with a classifier 710. In some aspects of the invention, the data sources 702 can bypass the network 704 and feed directly into the classifier 710. The data sources 702 provide data/information inputs that will be evaluated by the classifier 710 in accordance with embodiments of the invention. The data sources 702 also provide data/information inputs that can be used by the classifier 710 to train and/or update model(s) 716 created by the classifier 710. The data sources 702 can be implemented as a wide variety of data sources, including but not limited to, sensors configured to gather real time data, data repositories (including training data repositories), and outputs from other classifiers. The network 704 can be any type of communications network, including but not limited to local networks, wide area networks, private networks, the Internet, and the like.

The classifier 710 can be implemented as algorithms executed by a programmable computer such as a computing environment 1000 (shown in FIG. 11). As shown in FIG. 7A, the classifier 710 includes a suite of machine learning (ML) algorithms 712; natural language processing (NLP) algorithms 714; and model(s) 716 that are relationship (or prediction) algorithms generated (or learned) by the ML algorithms 712. The algorithms 712, 714, 716 of the classifier 710 are depicted separately for ease of illustration and explanation. In embodiments of the invention, the functions performed by the various algorithms 712, 714, 716 of the classifier 710 can be distributed differently than shown. For example, where the classifier 710 is configured to perform an overall task having sub-tasks, the suite of ML algorithms 712 can be segmented such that a portion of the ML algorithms 712 executes each sub-task and a portion of the ML algorithms 712 executes the overall task. Additionally, in some embodiments of the invention, the NLP algorithms 714 can be integrated within the ML algorithms 712.

The NLP algorithms 714 include speech recognition functionality that allows the classifier 710, and more specifically the ML algorithms 712, to receive natural language data (text and audio) and apply elements of language processing, information retrieval, and machine learning to derive meaning from the natural language inputs and potentially take action based on the derived meaning. The NLP algorithms 714 used in accordance with aspects of the invention can also include speech synthesis functionality that allows the classifier 710 to translate the result(s) 720 into natural language (text and audio) to communicate aspects of the result(s) 720 as natural language communications.

The NLP and ML algorithms 714, 712 receive and evaluate input data (i.e., training data and data-under-analysis) from the data sources 702. The ML algorithms 712 include functionality that is necessary to interpret and utilize the input data's format. For example, where the data sources 702 include image data, the ML algorithms 712 can include visual recognition software configured to interpret image data. The ML algorithms 712 apply machine learning techniques to received training data (e.g., data received from one or more of the data sources 702) in order to, over time, create/train/update one or more models 716 that model the overall task and the sub-tasks that the classifier 710 is designed to complete.

Figure 7B:
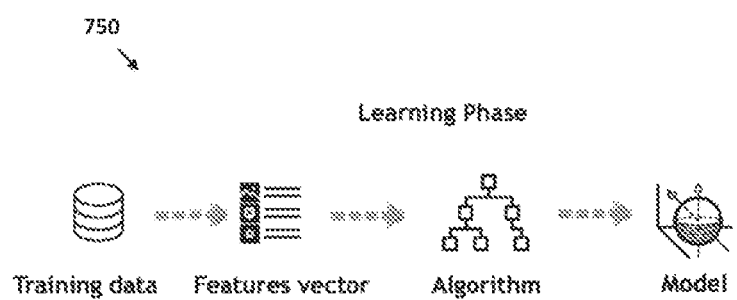
FIG. 7B depicts a learning phase that can be implemented by the machine learning system shown in FIG. 7A.

Referring now to FIGS. 7A and 7B collectively, FIG. 7B depicts an example of a learning phase 750 performed by the ML algorithms 712 to generate the above-described models 716. In the learning phase 750, the classifier 710 extracts features from the training data and coverts the features to vector representations that can be recognized and analyzed by the ML algorithms 712. The features vectors are analyzed by the ML algorithm 712 to "classify" the training data against the target model (or the model's task) and uncover relationships between and among the classified training data. Examples of suitable implementations of the ML algorithms 712 include but are not limited to neural networks, support vector machines (SVMs), logistic regression, decision trees, hidden Markov Models (HMMs), recurrent neural networks (RNNs), and the like. The learning or training performed by the ML algorithms 712 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 710 and the ML algorithms 712. Unsupervised learning can utilize additional learning/training methods including, for example, clustering, anomaly detection, neural networks, deep learning, and the like.

When the models 716 are sufficiently trained by the ML algorithms 712, the data sources 702 that generate "real world" data are accessed, and the "real world" data is applied to the models 716 to generate usable versions of the results 720. In some embodiments of the invention, the results 720 can be fed back to the classifier 710 and used by the ML algorithms 712 as additional training data for updating and/or refining the models 716.

In aspects of the invention, the ML algorithms 712 and the models 716 can be configured to apply confidence levels (CLs) to various ones of their results/determinations (including the results 720) in order to improve the overall accuracy of the particular result/determination. When the ML algorithms 712 and/or the models 716 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 710 can be configured to apply confidence levels (CLs) to the results 720. When the classifier 710 determines that a CL in the results 720 is below a predetermined threshold (TH) (i.e., CL<TH), the results 720 can be classified as sufficiently low to justify a classification of "no confidence" in the results 720. If CL>TH, the results 720 can be classified as sufficiently high to justify a determination that the results 720 are valid. Many different predetermined TH levels can be provided such that the results 720 with CL>TH can be ranked from the highest CL>TH to the lowest CL>TH.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
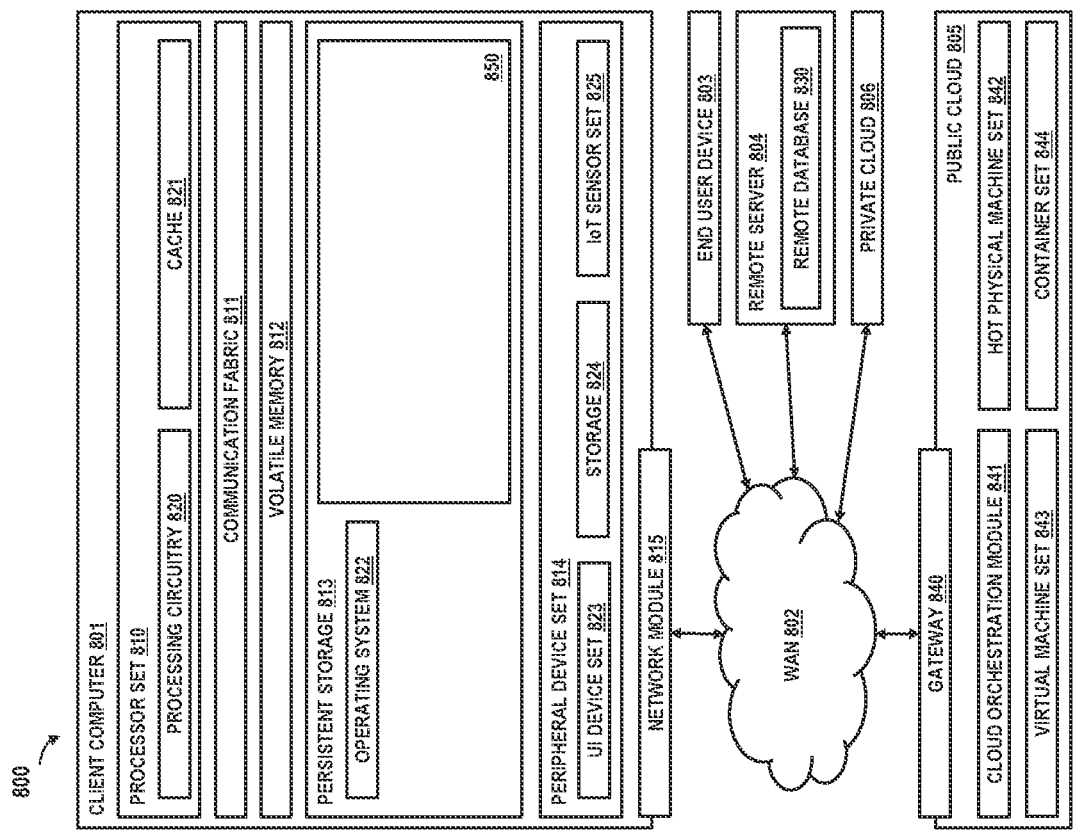
FIG. 8 depicts details of an exemplary computing environment operable to implement various aspects of the invention.

FIG. 8 depicts an example computing environment 800 that can be used to implement aspects of the invention. Computing environment 800 contains an example of an environment for the execution of at least some of the computer code involved in performing the inventive methods, such as an improved automated workflow composer 850. In addition to block 850, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 850, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip."

In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 850 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 850 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication", "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. An automated workflow composer comprising-a processor system that performs processor system operations comprising:
using a workflow generator of the processor system to perform an automated workflow composition process that generates a composed workflow that includes logical and metric goal characteristics comprising the composed workflow, when executed by a host device in a domain, satisfying a target logical goal in a manner that optimizes a target unmodeled metric goal;
wherein the composed workflow further includes a workflow sequence structure comprising multiple tasks and multiple cases;
wherein the multiple tasks comprise atomic tasks, multi-instance tasks, and multi-instance block tasks;
wherein the multiple cases are configured to execute on the host device in parallel and independently of one another;
wherein the automated workflow composition process comprises performing iterations of a sequential workflow evaluation process;
wherein each iteration of the sequential workflow evaluation process advances the automated workflow process toward generating the composed workflow that includes the logical and metric goal characteristics comprising the composed workflow, when executed by the host device in the domain, satisfying the target logical goal in the manner that optimizes the target unmodeled metric goal;
wherein each iteration of the sequential workflow evaluation process comprises:
using the workflow generator and an optimization engine to perform workflow generator operations and optimization engine operations to generate a candidate workflow sequence structure that is a candidate for the composed workflow, the candidate workflow sequence structure having an associated candidate logical goal that is a candidate for satisfying the target logical goal;
using the workflow-metric model of the workflow generator to incorporate a workflow-metric function into the workflow sequence generation operations and the optimization engine operations, wherein the workflow-metric function generates a predicted metric that results from executing the candidate workflow sequence, wherein the predicted metric is a candidate for satisfying the target unmodeled metric goal; and
using the workflow metric model and the optimization engine to bias the workflow sequence generation operations toward the target unmodeled metric goal by using the predicted metric to determine how close the candidate workflow is to satisfying the target logical goal; and
wherein the workflow-metric model has been trained, using a historical workflow-metric corpus and a neural network that implements a sequential decision-making (SDM) algorithm and a long short-term memory (LSTM) algorithm, to uncover the workflow-metric function;
wherein the historical workflow-metric corpus is generated by:
accessing already-performed workflow sequences from multiple domains; and
labeling the already-performed workflow sequences with multiple types of metrics that measure performance results of the already-performed historical workflow sequences; and
wherein the target unmodeled metric goals are unmodeled in that the target unmodeled metric goals correspond to the multiple types of metrics that measure the performance results of the already-performed historical workflow sequences; and
responsive to generating the composed workflow, converting the composed workflow into host-executable instructions, storing the host-executable instructions in non-volatile memory of the host device for execution of parallel threads corresponding to the multiple cases, such that each thread executes its respective case independently and in parallel, and wherein execution of the composed workflow by the host device expressly modifies a memory state of the host device in real time as the workflow progresses.

2. The automated workflow composer of claim 1, wherein the target unmodeled metric goal quantifies a performance feature of the composed workflow.

3. The automated workflow composer of claim 1, wherein the workflow-metric function comprises learned relationships between workflow sequences and metric-based goals.

4. The automated workflow composer of claim 1, wherein the workflow sequence generation operations comprise searching a plurality of combinations of possible workflows.

5. The automated workflow composer of claim 1, wherein:
the host device comprises a conversational agent; and
the target logical goal comprises a state of the conversational agent that can be either true or false.

6. The automated workflow composer of claim 1, wherein the automated workflow composition process generates the composed workflow based at least in part on the target logical goal, the target unmodeled metric goal, and features of the domain.

7. The automated workflow composer of claim 1, wherein:
the target unmodeled metric goal comprises a key performance indicator (KPI) goal; and
the workflow-metric model comprises a sequence-to-value predictor.

8. A computer-implemented method comprising:
using a workflow generator comprising a processor system to perform an automated workflow composition process that generates a composed workflow that includes logical and metric goal characteristics comprising the composed workflow, when executed by a host device in a domain, satisfying a target logical goal in a manner that optimizes a target unmodeled metric goal;
wherein the composed workflow further includes a workflow sequence structure comprising multiple tasks and multiple cases;
wherein the multiple tasks comprise atomic tasks, multi-instance tasks, and multi-instance block tasks;
wherein the multiple cases are configured to execute on the host device in parallel and independently of one another; wherein the automated workflow composition process comprises performing iterations of a sequential workflow evaluation process;
wherein each iteration of the sequential workflow evaluation process advances the automated workflow process toward generating the composed workflow that includes the logical and metric goal characteristics comprising the composed workflow, when executed by the host device in the domain, satisfying the target logical goal in the manner that optimizes the target unmodeled metric goal;

wherein each iteration of the sequential workflow evaluation process comprises:
using the workflow generator and an optimization engine to perform workflow generator operations and optimization engine operations to generate a candidate workflow sequence structure that is a candidate for the composed workflow, the candidate workflow sequence structure having an associated candidate logical goal that is a candidate for satisfying the target logical goal;
using the workflow-metric model of the workflow generator to incorporate a workflow-metric function into the workflow sequence generation operations and the optimization engine operations, wherein the workflow-metric function generates a predicted metric that results from executing the candidate workflow sequence, wherein the predicted metric is a candidate for satisfying the target unmodeled metric goal; and
using the workflow metric model and the optimization engine to bias the workflow sequence generation operations toward the target unmodeled metric goal by using the predicted metric to determine how close the candidate workflow is to satisfying the target logical goal;

wherein the workflow-metric model has been trained, using a historical workflow-metric corpus and a neural network that implements a sequential decision-making (SDM) algorithm and a long short-term memory (LSTM) algorithm, to uncover the workflow-metric function;

wherein the historical workflow-metric corpus is generated by:
accessing already-performed workflow sequences from multiple domains; and
labeling the already-performed workflow sequences with multiple types of metrics that measure performance results of the already-performed historical workflow sequences; and wherein the target unmodeled metric goals are unmodeled in that the target unmodeled metric goals correspond to the multiple types of metrics that measure the performance results of the already-performed historical workflow sequences; and responsive to generating the composed workflow, converting the composed workflow into host-executable instructions, storing the host-executable instructions in non-volatile memory of the host device for execution of parallel threads corresponding to the multiple cases, such that each thread executes its respective case independently and in parallel, and wherein execution of the composed workflow by the host device expressly modifies a memory state of the host device in real time as the workflow progresses.

9. The computer-implemented method of claim 8, wherein the target unmodeled metric goal quantifies a performance feature of the composed workflow.

10. The computer-implemented method of claim 8, wherein the workflow-metric function comprises learned relationships between workflow sequences and metric-based goals.

11. The computer-implemented method of claim 8, wherein the workflow sequence generation operations comprise searching a plurality of combinations of possible workflows.

12. The computer-implemented method of claim 8, wherein:
the host device comprises a conversational agent; and
the target logical goal comprises a state of the conversational agent that can be either true or false.

13. The computer-implemented method of claim 8, wherein the automated workflow composition process generates the composed workflow based at least in part on the target logical goal, the target unmodeled metric goal, and features of the domain.

14. The computer-implemented method of claim 8, wherein:
the target unmodeled metric goal comprises a key performance indicator (KPI) goal; and
the workflow-metric model comprises a sequence-to-value predictor.

15. A computer program product comprising a computer readable program stored on a computer readable storage medium, wherein the computer readable program, when executed on a processor system, causes the processor system to perform processor system operations comprising:
using a workflow generator of the processor system to perform an automated workflow composition process that generates a composed workflow that includes logical and metric goal characteristics comprising the composed workflow, when executed by a host device in a domain, satisfying a target logical goal in a manner that optimizes a target unmodeled metric goal;
wherein the composed workflow further includes a workflow sequence structure comprising multiple tasks and multiple cases;
wherein the multiple tasks comprise atomic tasks, multi-instance tasks, and multi-instance block tasks;
wherein the multiple cases are configured to execute on the host device in parallel and independently of one another;
wherein the automated workflow composition process comprises performing iterations of a sequential workflow evaluation process;
wherein each iteration of the sequential workflow evaluation process advances the automated workflow process toward generating the composed workflow that includes the logical and metric goal characteristics comprising the composed workflow, when executed by the host device in the domain, satisfying the target logical goal in the manner that optimizes the target unmodeled metric goal;
wherein each iteration of the sequential workflow evaluation process comprises:
using the workflow generator and an optimization engine to perform workflow generator operations and optimization engine operations to generate a candidate workflow sequence structure that is a candidate for the composed workflow, the candidate workflow sequence structure having an associated candidate logical goal that is a candidate for satisfying the target logical goal;
using the workflow-metric model of the workflow generator to incorporate a workflow-metric function into the workflow sequence generation operations and the optimization engine operations, wherein the workflow-metric function generates a predicted metric that results from executing the candidate workflow sequence, wherein the predicted metric is a candidate for satisfying the target unmodeled metric goal; and using the workflow metric model and the optimization engine to bias the workflow sequence generation operations toward the target unmodeled metric goal by using the predicted metric to determine how close the candidate workflow is to satisfying the target logical goal;

wherein the workflow-metric model has been trained, using a historical workflow-metric corpus and a neural network that implements a sequential decision-making (SDM) algorithm and a long short-term memory (LSTM) algorithm, to uncover the workflow-metric function;

wherein the historical workflow-metric corpus is generated by:

accessing already-performed workflow sequences from multiple domains; and labeling the already-performed workflow sequences with multiple types of metrics that measure performance results of the already-performed historical workflow sequences; and wherein the target unmodeled metric goals are unmodeled in that the target unmodeled metric goals correspond to the multiple types of metrics that measure the performance results of the already-performed historical workflow sequences; and responsive to generating the composed workflow, converting the composed workflow into host-executable instructions, storing the host-executable instructions in non-volatile memory of the host device for execution of parallel threads corresponding to the multiple cases, such that each thread executes its respective case independently and in parallel, and wherein execution of the composed workflow by the host device expressly modifies a memory state of the host device in real time as the workflow progresses.

16. The computer program product of claim 15, wherein the target unmodeled metric goal quantifies a performance feature of the composed workflow.

17. The computer program product of claim 15, wherein:
the workflow-metric function comprises learned relationships between workflow sequences and metric-based goals; and
the workflow sequence generation operations comprise searching a plurality of combinations of possible workflows.

18. The computer program product of claim 15, wherein:
the host device comprises a conversational agent; and
the target logical goal comprises a state of the conversational agent that can be either true or false.

19. The computer program product of claim 15, wherein the automated workflow composition process generates the composed workflow based at least in part on the target logical goal, the target unmodeled metric goal, and features of the domain.

20. The computer program product of claim 15, wherein:
the target unmodeled metric goal comprises a key performance indicator (KPI) goal; and
the workflow-metric model comprises a sequence-to-value predictor.

* * * * *